United States Patent Office 2,952,646
Patented Sept. 13, 1960

2,952,646

SYNTHETIC RESIN AND METHOD OF PRODUCING THE SAME

Raymond F. Carmody, Metuchen, N.J., assignor to Socony Mobil Oil Company, Inc., a corporation of New York No Drawing. Filed May 2, 1957, Ser. No. 656,500

7 Claims. (Cl. 260—20)

This invention is directed to resinous compositions and to coating compositions formed therewith. The invention is also concerned with a method for producing the resinous compositions.

As is well known in the art, petroleum resins impart chemical resistance, hardness and adhesion to protective coatings. These properties are a function of the high degree of unsaturation of the polyolefinic structure of high molecular weight hydrocarbon polymers. In the past, petroleum resins have been reacted with vegetable oils to form a modified resin. However, only a fraction of the olefinic functionality of the resin is used, such that the modified resin is characterized by a limiting inherent weakness: brittleness. The high residual unsaturation of the modified resin continues to oxidize until no residual plasticization remains and films thereof become brittle. In order to overcome this weakness, it is necessary to resort to long oil length modified resins, at the expense of the chemical resistance, adhesion and hardness contributed by the petroleum resin. In addition, a secondary disadvantage of the modified resin is a relatively high solubility in numerous solvents such that low viscosities thereof result.

It is an object of this invention to prepare new resinous compositions from certain petroleum resins.

Another object of this invention is to provide a method for preparing the new resinous compositions.

Other objects of this invention are made clear by the following description.

It is to be understood that the term "petroleum resin," as used herein, connotes a resinous material of petroleum origin as described by Carleton Ellis in "The Chemistry of Synthetic Resins," volume 1, 1935, chapter 10. The term "dienophile" is used in the accepted manner, as described by Cheves Walling, in chapter 47 of "The Chemistry of Petroleum Hydrocarbons," volume III, 1955. The terms "short oil varnish," "medium oil varnish" and "long oil varnish" are used as described in "Stewart's Scientific Dictionary," J. R. Stewart, 1953, 4th edition, published by the Stewart Research Laboratory, Alexandria, Virginia. "Short oil varnish" signifies a varnish relatively high in resin content, containing usually less than 12½ gallons of oil per 100 pounds of resin. "Medium oil varnish" signifies a varnish of medium resin content, usually containing from 10 to 25 gallons of oil per 100 pounds of resin. "Long oil varnish" means an oleoresinous varnish relatively low in resin content and high in oil content; it usually contains more than 25 gallons of oil per 100 pounds of resin.

The foregoing objects have been realized by resorting to the new method set out below:

(1) Reacting a polyolefinic petroleum resin with a polybasic acidic dienophile at a temperature between about 300° F. and about 450° F., the quantity of said dienophile being from about 5 to about 12½ percent by weight of said resin, whereupon an adduct of said reactants is formed;

(2) Reacting said adduct with an oil having an iodine number up to about 200, the quantity of oil so reacted being such that the final product has an "oil length" between about 5 and about 18, in the presence of an acidolysis catalyst, at a temperature between about 400° F. and about 500° F. for about 1 to about 2 hours, to form an acidic product; and (3) Reacting said acidic product with a polyhydric alcohol at a temperature from about 400° F. to about 450° F., the quantity of polyhydric alcohol so reacted being at least sufficient for complete esterification of the carboxylic acid groups present in said acidic products, whereupon the desired oil-modified resinous composition is formed.

The polyolefinic petroleum resins used herein have the following properties:

| | Range |
|---|---|
| Iodine number | 90–225. |
| Specific gravity | 1.00–1.10. |
| Acid number | 0–2. |
| Saponification number | 0–2. |
| Viscosity (S.U.S. at 210° F.) | 120–190 to solid. |

Preferred are those polyolefinic petroleum resins having iodine numbers from about 150 to about 200. Particularly advantageous herein is a polyolefinic petroleum resin (Resin A) derived from tar bottoms, which is obtained by cracking of petroleum. Properties of this petroleum resin are:

| | |
|---|---|
| Iodine number | 170 (minimum). |
| Specific gravity, 60/60° F | 1.007–1.029. |
| Gravity, API, 60° F | 6–9. |
| Acid number | 0–2. |
| Saponification number | 0–2. |
| Viscosity (S.U.S. at 210° F.) | 120–190. |
| Weight/gallon, 60° F | 8.39–8.57. |
| Solids (non-volatile, 3 hours at 150° F.), percent | 85–90. |
| Color | Dark. |

As indicated above, the petroleum resin is reacted with a polybasic acidic dienophile. Typical of the latter are: maleic, fumaric, mesaconic, citraconic, itaconic anhydrides and their corresponding acids. Of these compounds, maleic anhydride is particularly advantageous.

In step (1), the polyolefinic petroleum resin and the dienophile are heated at a temperature between about 300° F. and about 450° F. A particularly desirable procedure involves heating the petroleum resin to about 300° F., adding the dienophile thereto and gradually increasing the temperature to about 450° F. at the rate of one-and-one-half degrees per minute. At temperatures below about 350° F., reaction is slow. At temperatures above about 450° F., sublimation of maleic anhydride and the like, occurs. In general, about 1 to about 2 hours are required to complete the reaction, the result of which is adduct formation. The quantity of dienophile used is related to the degree of unsaturation of the petroleum resin. Generally, from about 0.05 to about 0.13 mole of dienophile is used for 100 grams of petroleum resin. Stated in another manner, from about 5 to about 12.5 percent of dienophile, such as maleic anhydride, based upon the petroleum resin, has been found to be a preferred range.

Reacted in step (2) with the adduct formed in step (1) is an oil or a mixture of oils. The oils contemplated herein are those which have iodine numbers (a measure of their degree of unsaturation) of about 200 or less. That is, the oils can be unsaturated or saturated. However, the most desirable products are those prepared with oils having iodine numbers from about 140 to about 175. When the iodine number of an oil is substantially below 140, the products are of low viscosity. When the iodine number is substantially greater than about 200, the products are excessively reactive at low oil lengths. Representative oils are: dehydrated castor oil, soy bean oil, coconut oil, linseed oil, safflower oil, fish oils such as menhaden and sperm oils. Of such oils, dehydrated castor oil is particularly preferred.

It is to be understood that highly unsaturated oils such as tung oil and oiticica oil, can be used in combination with the aforesaid oils so long as the iodine number value of the combined oils does not exceed about 200. Highly unsaturated oils, such as tung and oiticica, gel at such relatively low temperatures, that they should not be used as the sole oil source.

In step (2), the oil and an acidolysis (or transesterification) catalyst are added to the petroleum adduct, maintained at about 450° F. The temperature is maintained within the range 400 to 500° F., preferably about 450° F. Reaction time is generally of the order of 1 to 2 hours, advantageously about 2 hours. Acidolysis or transesterification catalysts useful here are such as litharge (PbO), calcium oxide, lithium hydroxide, lead naphthenate, calcium naphthenate and the like. Litharge is preferred. Catalytic amounts of the catalysts are used, that is, of the order of one-tenth of one percent based upon the total weight of reactants in step (2).

The quantity of oil reacted with the adduct is such that the final product (formed in step (3)) has an oil length between about 5 and about 18, preferably an oil length from 6 to 12 gallons. Surprisingly, the products of this invention have: excellent resistance to chemicals and solvents; flexibility; adhesion, and fabrication. The latter term refers to the ability of panels coated with products of this invention, to be formed into various shapes without breaking of the coating.

Formed by reaction of the adduct and oil is an interpolymer having one or more carboxylic group per polymer unit. A polyhydric alcohol is reacted in step (3), with the interpolymer at a temperature from about 400° F. to about 450° F., whereupon the desired product is obtained. In general, the reaction time will be of the order of 1 to about 2 hours. It is advantageous to conduct the reaction in the presence of a solvent, preferably a xylene, and at a temperature at which the solvent refluxes. Other suitable solvents are benzene and aromatic fractions which reflux at the temperatures used herein.

Polyhydric alcohols and polyhydric phenols are contemplated herein for use in step (3) and are those which are represented by: glycerine, trimethylolethane, pentaerythritol, sorbitol, resorcinol, catechol, hydroquinone and the like. Preferred are the alcohols, particularly glycerine and pentaerythritol.

Di- and tri-pentaerythritols and alcohols having a functionality greater than four are generally to be avoided since the functionality of the system is such that only a minor reaction is possible before gelation occurs.

In step (3), the alcohol is usually employed in an amount exceeding by at least five percent, but not more than about fifteen percent, the proportion theoretically required for complete esterification of all the carboxylic acids in the reaction mixture.

As indicated by the foregoing description, equipment used for preparing the resinous compositions of this invention is of conventional nature. Pressure equipment is not necessary, inasmuch as high pressures are not developed during the procedure. As a rule, atmospheric pressures obtain.

The following examples are provided by way of illustration of the invention. In the examples, the amounts are specified as parts by weight. The Gardner scale is used in reporting viscosity. "Cure time" as used herein, is the time in seconds for a film 0.0015 inch thick to convert to an infusible, insoluble condition on a stainless steel surface at 230° C.

EXAMPLE I

| | Parts |
|---|---|
| Petroleum resin (Resin A, above) | 180.0 |
| Maleic anhydride | 18.5 |
| Dehydrated castor oil, G–H viscosity | 51.6 |
| Dehydrated castor oil, $Z_2$ viscosity | 51.6 |
| Litharge (PbO) | 0.2 |
| Pentaerythritol | 15.4 |
| $H_2O$ loss | 3.4 |

The petroleum resin was heated to about 300° F. Maleic anhydride was added to the molten petroleum resin at 300° F. The temperature of the mixture thus formed was increased to about 450° F. at the rate of approximately 1½ degrees per minute. The dehydrated castor oils and litharge were then added to the resin-maleic anhydride adduct, maintained at about 450° F. The latter temperature was continued for about two hours.

Xylene was added, as was the pentaerythritol. The reaction mixture was refluxed at about 425° F. for about 1–2 hours, whereupon the desired resin was formed.

Throughout the preparation, the reactants were agitated continuously.

The final product has an oil length of 6.1. Its viscosity is R–S (50% non-volatile, mineral spirits), and cure time is 25 seconds.

EXAMPLE II

| | Parts |
|---|---|
| Petroleum resin (Resin A, above) | 812 |
| Fumaric acid | 89 |
| Dehydrated castor oil, G–H viscosity | 233 |
| Dehydrated castor oil, $Z_2$ viscosity | 233 |
| Litharge (PbO) | 1 |
| Pentaerythritol | 66 |
| Water loss | 27 |

The procedure given in Example I was followed. The resin so obtained has an oil length of 6.2, a viscosity of B–C, (50% non-volatile, mineral spirits), and a cure of 22 seconds.

EXAMPLE III

| | Parts |
|---|---|
| Petroleum resin (Resin A, above) | 1100 |
| Maleic anhydride | 113 |
| Dehydrated castor oil, G–H viscosity | 316 |
| Dehydrated castor oil, $Z_2$ viscosity | 316 |
| Litharge (PbO) | 1 |
| Glycerine | 84 |
| Water loss | 24 |

The procedure of Example I was followed. The resin obtained has an oil length of 6.2, a viscosity of D–E (50% non-volatile, mineral spirits), and a cure of 25 seconds.

EXAMPLE IV

| | Parts |
|---|---|
| Petroleum resin (Resin A, above) | 1100 |
| Maleic anhydride | 113 |
| Dehydrated castor oil, G–H viscosity | 472 |
| Dehydrated castor oil, $Z_2$ viscosity | 472 |
| Litharge (PbO) | 1 |
| Pentaerythritol | 94 |
| Water loss | 24 |

The procedure of Example I was followed. The resin product has an oil length of 9.0, a viscosity of L–M (50% non-volatile, mineral spirits), and a cure of 40 seconds.

EXAMPLE V

| | Parts |
|---|---|
| Petroleum resin [1] | 1100 |
| Maleic anhydride | 113 |
| Dehydrated castor oil, G–H viscosity | 316 |
| Dehydrated castor oil, $Z_2$ viscosity | 316 |
| Litharge (PbO) | 1 |
| Pentaerythritol | 94 |
| Water loss | 24 |

[1] Properties of this resin are:
Iodine No ___ 160
Melting point (capillary tube), °C ___ 115–129
Solid.

The procedure of Example I was followed. The resin obtained has an oil length of 6.2, a viscosity of L–M and a cure of 38 seconds.

EXAMPLE VI

| | Parts |
|---|---|
| Petroleum resin (Resin A, above) | 1100 |
| Maleic anhydride | 113 |
| Dehydrated castor oil, G–H viscosity | 632 |
| Litharge (PbO) | 1 |
| Pentaerythritol | 94 |
| Water loss | 24 |

With the procedure of Example I, a resin was obtained having the following characteristics: oil length 6.2, viscosity B+, and cure 44 seconds.

EXAMPLE VII

| | Parts |
|---|---|
| Petroleum resin (Resin A, above) | 1100 |
| Maleic anhydride | 113 |
| Dehydrated castor oil, $Z_2$ viscosity | 1240 |
| Litharge (PbO) | 2 |
| Glycerine | 85 |
| Water loss | 24 |

With the procedure of Example I, a resin of the following character was obtained: oil length 12, viscosity H+ (50% non-volatile, mineral spirits), cure 28 seconds.

EXAMPLE VIII

| | Parts |
|---|---|
| Petroleum resin (Resin A, above) | 1100 |
| Maleic anhydride | 113 |
| Dehydrated castor oil, G–H viscosity | 1240 |
| Litharge (PbO) | 2 |
| Glycerine | 85 |
| Water loss | 24 |

The resin obtained, using the procedure of Example I, has the following properties: 12.5 oil length, viscosity E+ (50% non-volatile, mineral spirits), cure 29 seconds.

EXAMPLE IX

| | Parts |
|---|---|
| Petroleum resin (Resin A, above) | 1100 |
| Maleic anhydride | 113 |
| Dehydrated castor oil, $Z_2$ viscosity | 632 |
| Litharge (PbO) | 1 |
| Glycerine | 84 |
| Water loss | 24 |

The resin obtained, using the procedure of Example I, is characterized by: oil length 6.2 viscosity U+ (52% non-volatile, mineral spirts), cure 22 seconds.

EXAMPLE X

| | Parts |
|---|---|
| Petroleum resin (Resin A, above) | 550 |
| Maleic anhydride | 56.5 |
| Dehydrated castor oil, G–H viscosity | 316 |
| Litharge (PbO) | 0.5 |
| Glycerine | 42 |
| Water loss | 12 |

Following the procedure of Example I, a resin of the following character was formed: oil length 6.2, acid number 4, viscosity N (60% non-volatile, mineral spirits), and cure 26 seconds.

EXAMPLE XI

| | Parts |
|---|---|
| Petroleum resin (Resin A, above) | 900 |
| Maleic anhydride | 46 |
| Oiticica oil | 516 |
| Litharge (PbO) | 1 |
| Pentaerythritol | 39 |
| Water loss | 9 |

The procedure of Example I was followed. The resin product has an oil length of 5.3, a viscosity of A+, and a cure of 18 seconds.

EXAMPLE XII

| | Parts |
|---|---|
| Petroleum resin (Resin A, above) | 900 |
| Maleic anhydride | 46 |
| Oiticica oil | 516 |
| Litharge (PbO) | 1 |
| Pentaerythritol (technical) [1] | 42 |
| Water loss | 9 |

[1] This contains 88% mono-pentaerythritol and 12% of di-pentaerythritol.

Following the procedure of Example I, a resin of the following character was obtained: oil length 5.3, viscosity B+, cure 21 seconds.

EXAMPLE XIII

| | Parts |
|---|---|
| Petroleum resin (Resin A, above) | 900 |
| Maleic anhydride | 46 |
| Oiticica oil | 258 |
| Tall oil fatty acids | 257 |
| Litharge (PbO) | 1 |
| Pentaerythritol (technical) [1] | 68 |
| Water loss | 25 |

[1] This contains 88% mono-pentaerythritol and 12% of di-pentaerythritol.

This product is of less value as a heat convertible resin because of its solubility and high cure. It has possible interest as a plasticizer.

Using the procedure of Example I, a resin of the following character was obtained: oil length 6, viscosity <AS, cure >120 seconds.

EXAMPLE XIV

| | Parts |
|---|---|
| Petroleum resin [1] | 1100 |
| Maleic anhydride | 113 |
| Dehydrated castor oil, G–H viscosity | 632 |
| Litharge (PbO) | 1 |
| Pentaerythritol | 94 |
| Water loss | 24 |

[1] Properties of this resin are:
Specific gravity ___ 1.08–1.10
Melting point ___ °F__ 200–220
Acid number ___ 0–2
Saponification number ___ 0–2

The resin obtained, using the method of Example I, has the following properties: oil length 6, viscosity D, cure time 115 seconds.

EXAMPLE XV

In contrast to the excellent results obtained with petroleum resins, it has been found that polyisobutylenes are unsatisfactory herein.

| | Parts |
|---|---|
| Polyisobutylene [1] | 1100 |
| Maleic anhydride | 110 |
| Tall oil fatty acids | 612 |
| Litharge (PbO) | 1 |
| Glycerol | 138 |
| Water loss | 75 |

[1] This material has the following properties:
Molecular weight (average) ___ 940
Viscosity, Say. secs. @ 100° F ___ 140,000
Viscosity, Gardner-Holdt @ 77° F ___ Z–9
Specific gravity, 60/60° F ___ 0.894
Refractive index ___ 1.4955

No product was obtained in following the procedure of Example I, since gelation occurred in the presence of the oil.

EXAMPLE XVI

| | Parts |
|---|---|
| Petroleum resin[1] | 1100 |
| Wood rosin[2] | 110 |
| Maleic anhydride | 113 |
| Dehydrated castor oil, G–H viscosity | 316 |
| Dehydrated castor oil, $Z_2$ viscosity | 316 |
| CaO | 1 |
| Pentaerythritol | 105 |
| Water loss | 29 |

[1] Properties of this resin are:

| | |
|---|---|
| Specific gravity | 1.08–1.10 |
| Melting point, °F | 200–220 |
| Acid number | 0–2 |
| Saponification number | 0–2 |

[2] Properties of this material are:

| | |
|---|---|
| Melting point, °F | 142 |
| Acid number | 168 |
| Saponification number | 172 |
| Unsaponifiables, percent | 7.5 |

Following the procedure of Example I, a resin having the following properties was obtained: oil length 4.5, viscosity at G, cure 55 seconds.

Utility

The products of this invention are useful for a variety of applications. They can serve as: baking type vehicles, unpigmented resistant liners for drums, pails and cans; jar closure coatings; sanitary can liners; drum coatings; pigmented roller coatings; aluminum vehicles; etc.

I claim:

1. The process for preparing an oil-modified resinous composition, which comprises: (1) reacting a polyolefinic petroleum resin with an aliphatic polybasic acidic dienophile at a temperature between about 300° F. and about 450° F., the quantity of said dienophile being from about 5 to about 12 percent by weight of said petroleum resin, whereupon an adduct of said reactants is formed; (2) reacting said adduct with an oil having an iodine number up to about 200, the quantity of oil so reacted being such that the final product has an oil length between about 5 and about 18, in the presence of an acidolysis catalyst at a temperature between about 400° F. and about 500° F. for about 1 to about 2 hours, to form an acidic product; and (3) reacting said acidic product with a polyhydric material having up to four hydroxyl groups per molecule and being selected from the group consisting of a polyhydric alcohol and a polyhydric phenol at a temperature from about 400° F. to about 450° F., the quantity of polyhydric material so reacted being at least sufficient for complete esterification of the carboxylic acid groups present in said acidic product, whereupon the desired oil-modified resinous composition is formed; said polyolefinic petroleum resin being derived from tar bottoms obtained by cracking of petroleum, and having the following characteristics:

| | Range |
|---|---|
| Iodine number | 90–225. |
| Specific gravity | 1.00–1.10. |
| Acid number | 0–2. |
| Saponification number | 0–2. |
| Viscosity (S.U.S. at 210° F.) | 120–190 to solid. |

2. The process of claim 1 wherein the polyolefinic material is a petroleum resin having the following characteristics:

| | |
|---|---|
| Iodine number | 170 (minimum) |
| Specific gravity, 60/60° F. | 1.007–1.029 |
| Gravity, API, 60° F. | 6–9 |
| Acid number | 0–2 |
| Saponification number | 0–2 |
| Viscosity (S.U.S. @ 210° F.) | 120–190 |

3. The process of claim 1 wherein the polybasic acidic dienophile is maleic anhydride.

4. The process of claim 1 wherein the oil is dehydrated castor oil having an iodine number of about 140.

5. The process of claim 1 wherein the oil is a vegetable oil having an iodine number from about 140 to about 175.

6. The process of claim 1 wherein the polyhydric alcohol is glycerol.

7. An oil-modified resinous composition prepared by the process of claim 1.

References Cited in the file of this patent

UNITED STATES PATENTS

| | | |
|---|---|---|
| 1,993,027 | Peterson | Mar. 5, 1935 |
| 1,993,031 | Peterson | Mar. 5, 1935 |
| 1,993,035 | Littmann | Mar. 5, 1935 |
| 2,039,364 | Thomas et al. | May 5, 1936 |
| 2,039,367 | Thomas | May 5, 1936 |
| 2,119,976 | Wilson | June 7, 1938 |
| 2,142,980 | Huijser et al. | Jan. 3, 1939 |
| 2,321,750 | Humphrey | June 15, 1943 |
| 2,348,575 | Rummelsburg | May 9, 1944 |
| 2,467,958 | Bloch | Apr. 19, 1949 |
| 2,535,606 | Smith | Dec. 26, 1950 |

OTHER REFERENCES

Lee et al.: Drying Oils and Resins From Petroleum Sources, pages 16–25, Paint, Oil and Chem. Rev., Jan. 8, 1948.